United States Patent [19]

Lieber

[11] 4,025,228

[45] May 24, 1977

[54] HYDRAULIC PLANT

[75] Inventor: Jean Lieber, Geneva, Switzerland

[73] Assignee: Ateliers des Charmilles S.A., Geneva, Switzerland

[22] Filed: June 24, 1975

[21] Appl. No.: 589,799

[30] Foreign Application Priority Data

July 9, 1974 Switzerland .................. 9399/74

[52] U.S. Cl. .................. 415/205; 415/219 C
[51] Int. Cl.² .................. F01D 1/08
[58] Field of Search .............. 415/203, 205, 219 C, 415/60, 62, 63, 64, 198, 219 C

[56] References Cited

UNITED STATES PATENTS

| | | | |
|---|---|---|---|
| 2,341,871 | 2/1944 | Karrer | 415/219 C |
| 2,577,179 | 12/1951 | Buchi | 415/205 |
| 3,005,618 | 10/1961 | Buchi | 415/184 |
| 3,137,477 | 6/1964 | Kofink | 415/205 |
| 3,236,498 | 2/1966 | Kerensky | 415/500 |
| 3,238,534 | 3/1966 | Hartland | 415/500 |

FOREIGN PATENTS OR APPLICATIONS

| | | | |
|---|---|---|---|
| 1,044,006 | 6/1953 | France | 415/219 C |
| 60,006 | 4/1923 | Sweden | 415/205 |
| 221,513 | 8/1942 | Switzerland | 415/219 C |
| 221,144 | 1/1943 | Switzerland | 415/219 C |
| 221,163 | 9/1942 | Switzerland | 415/219 C |
| 280,616 | 5/1952 | Switzerland | 415/219 C |
| 306,143 | 9/1952 | Switzerland | 415/219 C |
| 399,891 | 10/1933 | United Kingdom | 415/203 |
| 559,840 | 3/1944 | United Kingdom | 415/219 C |

Primary Examiner—Henry F. Raduazo
Attorney, Agent, or Firm—Emory L. Groff, Jr.

[57] ABSTRACT

In a hydraulic plant comprising one or more machines of the reaction turbine or rotary pump type, the conventional single spiral casing of each machine is replaced by several partial volutes connecting the periphery of the fixed supporting blade ring by several independent tubular connection elements to a pressure pipeline.

1 Claim, 10 Drawing Figures

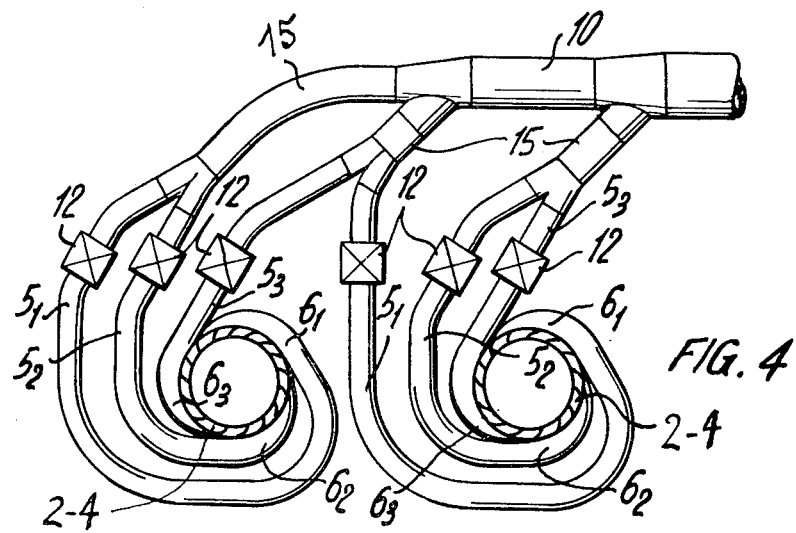
FIG. 4
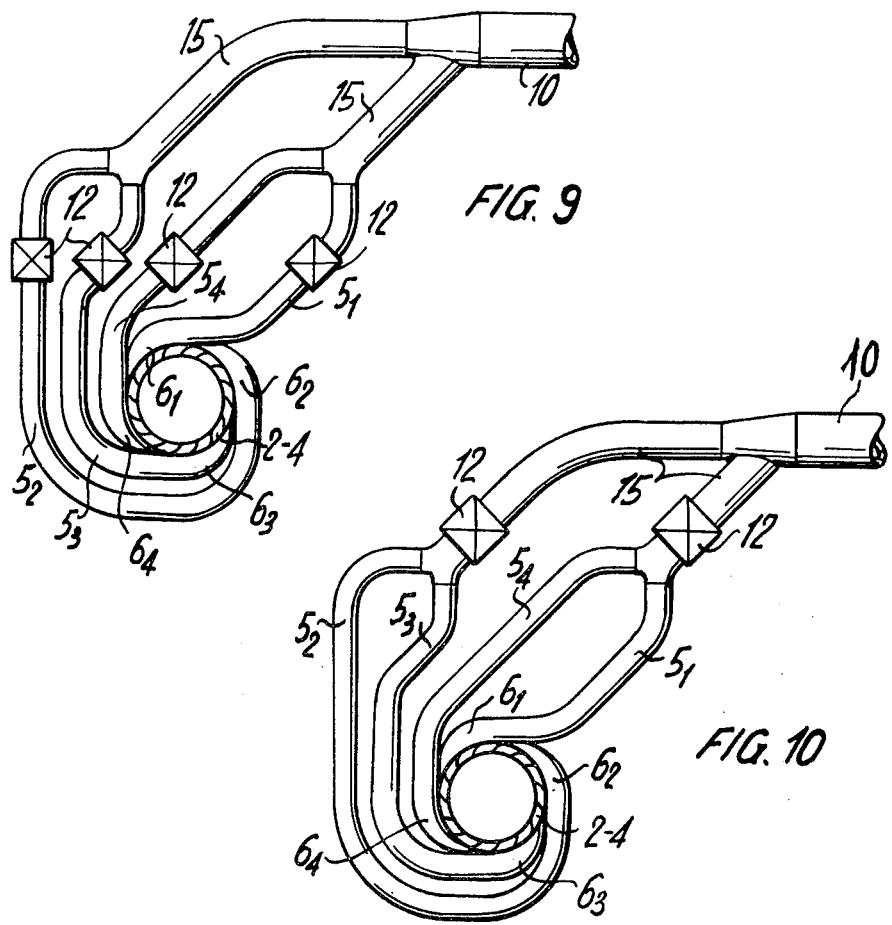
FIG. 9
FIG. 10

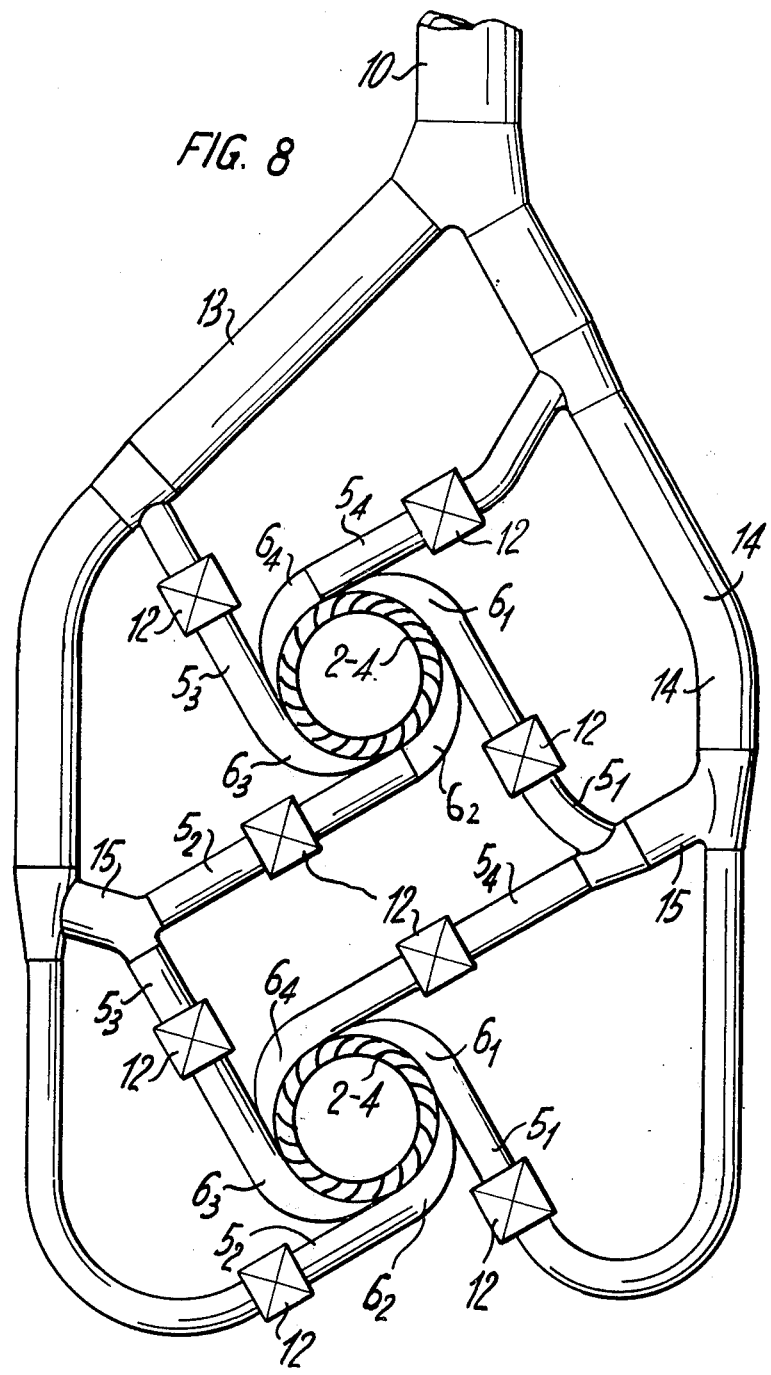

HYDRAULIC PLANT

The invention relates to hydraulic installations which comprise either one or several reaction turbines, one or several pumps, or a turbine-pump assembly, for the production, storage or transfer of energy. Such an installation will hereinafter be referred to as a hydraulic power plant.

In the usual hydraulic power plant, each of the machines has a spiral casing supplied with or delivering water from or to a high pressure pipeline.

The current tendency is to use pressure pipelines with a diameter greater than 3 m and a head of more than 500 m, and therefore only turbines of great dimensions and high-output pumps may be connected to these pressure pipelines. The dimensions of spiral casings for connection of such machines to the pressure pipeline are such that they cannot be manufactured in a factory. Instead, it is necessary to assemble these spiral casings from pipe sections which have to be separately transported to the site and are welded together and onto base rings of a ring of supporting blades.

Also, the strength of the fixed parts of such machines must be calculated as a function of the stresses applied to the part of the spiral casing of greatest diameter. For this reason, relatively thick sheet metal is used to manufacture the pipe sections of the spiral chamber, and the strength of the ring of supporting blades is calculated as a function of the stresses it is subjected to facing the largest pipe section of the spiral chamber.

The invention therefore aims, in such a hydraulic power plant, to spread out the hydraulic forces about the ring of supporting blades, to simultaneously reduce the cost price of the elements for connecting the machine to the pressure pipeline, and to simplify connection of the machine to the pressure pipeline at the site.

According to the invention a hydraulic power plant comprises at least one machine of the reaction turbine or rotary pump type and a plurality of independent tubular connection elements connecting the fixed parts of the or each machine to a pressure pipeline.

The accompanying drawings show, schematically and by way of example, a part of a conventional plant, and the corresponding parts of several embodiments of the invention, and variations thereof. In the drawings:

FIG. 4 is a view similar to FIG. 3, showing a variation of the first embodiment.

FIG. 8 is a view similar to FIG. 7, showing a variation of the second embodiment.

FIG. 9 is a top plan view, partly in transverse cross-section, of a third embodiment, showing the fixed part of a reaction turbine or a pump connected to a single pressure pipeline.

FIG. 10 is a view similar to FIG. 9, showing a variation of the third embodiment.

Figure 1:
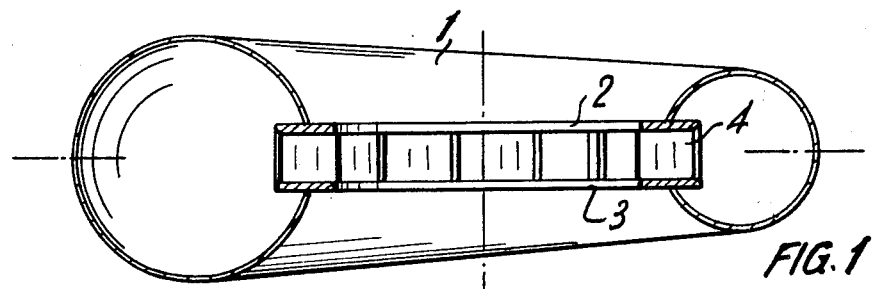
FIG. 1 is an axial cross-section through a ring of supporting blades and a spiral casing of a conventional turbine.
Figure 2:
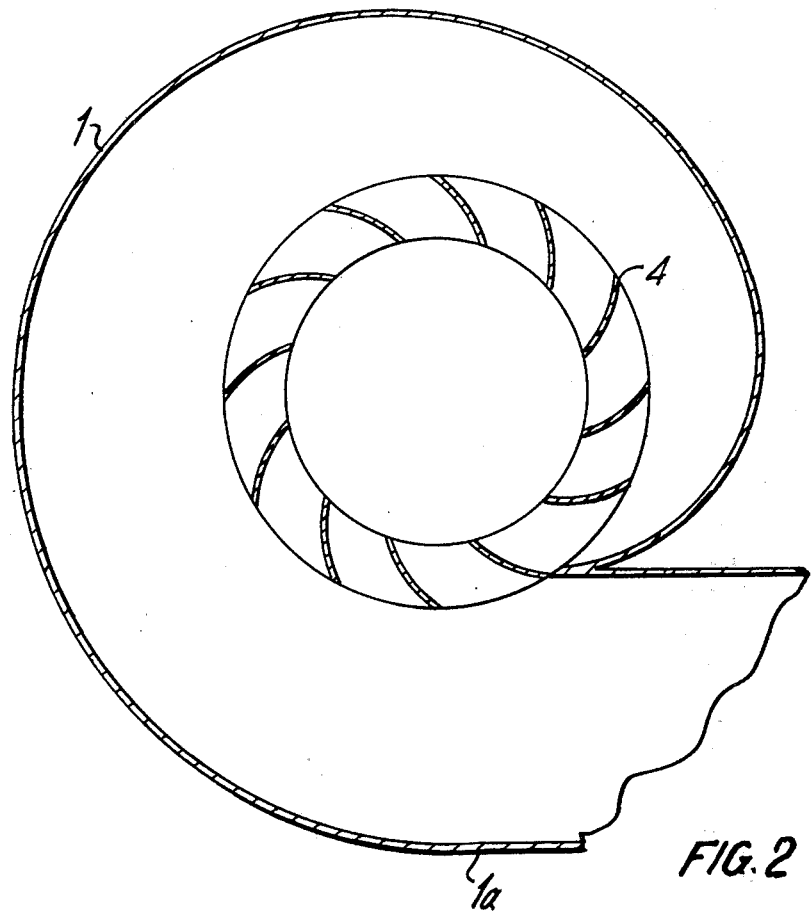
FIG. 2 is a transverse cross-section along line II—II of FIG. 1.

As shown in FIGS. 1 and 2, a spiral casing of a conventional turbine is formed by an assembly of split pipe sections 1 welded at their split edges to outer faces of two base rings 2, 3 connected together and spaced apart by supporting blades 4 forming pre-guide blades of the turbine.

The individual pipe sections of the assembly of pipe sections 1 are placed end-to-end and welded to one another, and have a diameter progressively decreasing from the pipe section 1a nearest the pressure pipeline to which the spiral casing is connected. It is at the location of this largest-diameter pipe section 1a that the greater stresses are applied both to the spiral casing and to the supporting blades 4.

Figure 3:
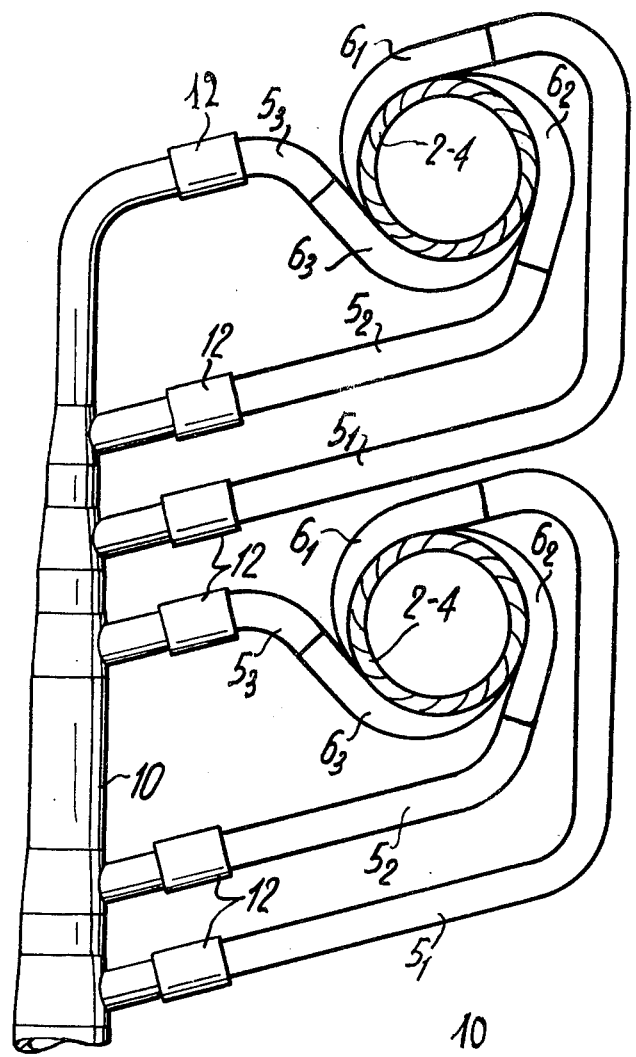
FIG. 3 is a top plan view, partly in transverse cross-section, of a first embodiment of the invention showing the fixed parts of two reaction turbines both connected to a single pressure pipeline.

In order to spread the stresses to which the spiral casing and the supporting blades are submitted substantially equally about the supporting blade ring 2–4, it is proposed to substitute for a single connection element, of a diameter corresponding to that of the largest pipe section 1a, between the spiral casing and a pressure pipeline 10, several connection element $5_1$, $5_2$, $5_3$ (FIG. 3) of smaller diameter than said single connection element. Simultaneously, the total volume of water surrounding the supporting blade ring is reduced. Moreover, each of the connection elements $5_1$, $5_2$, $5_3$ is fitted with a valve or gate 12 of reduced dimensions.

Instead of being individually connected to the pressure pipeline 10, the connection elements $5_1$, $5_2$, $5_3$ may be connected in pairs to the pipeline 10, as shown in FIG. 4. In this case, the connection elements of two adjacent turbines, such as $5_1$ of one and $5_3$ of the other, may be connected by a common manifold 15 to the pressure pipeline 10.

Figure 5:
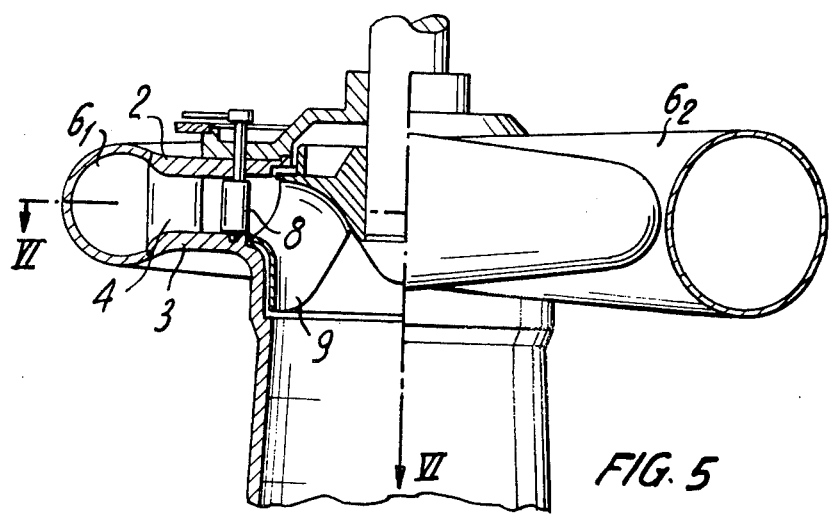
FIG. 5 shows the fixed part and the runner of a turbine corresponding to the embodiment of FIG. 3, on an enlarged scale, partly in cross-section and partly in side elevation.
Figure 6:
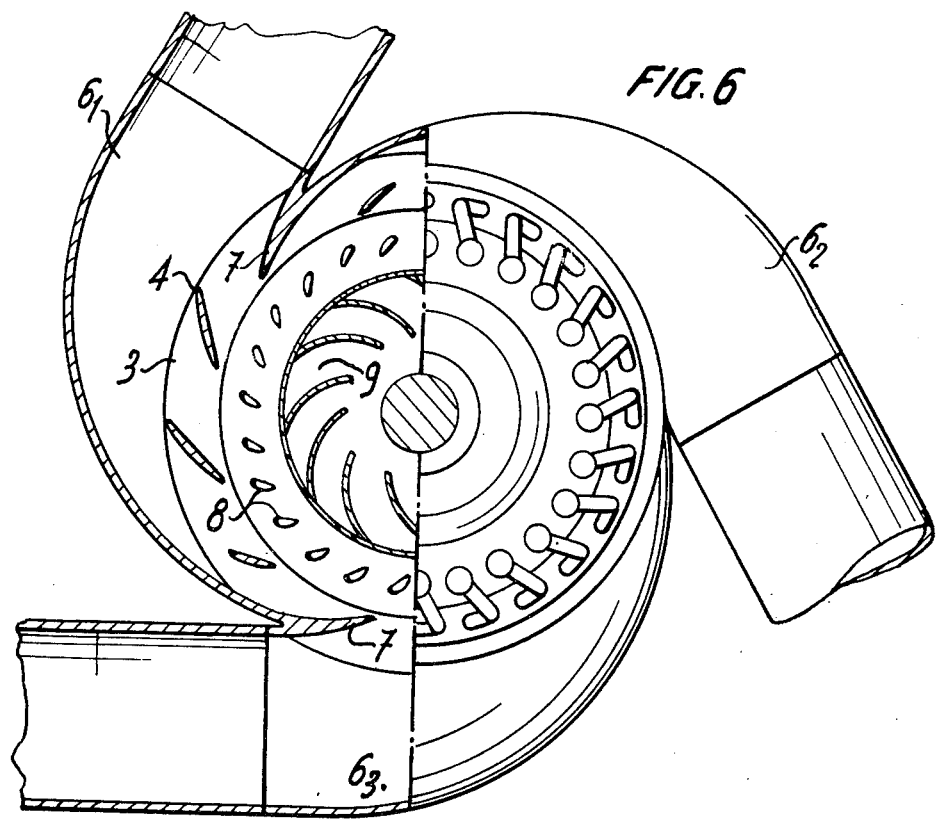
FIG. 6 is a top plan view, partly in cross-section along line VI—VI of FIG. 5.

As shown in detail in FIGS. 5 and 6, the connection elements $5_1$, $5_2$, $5_3$ form spiral sections or partial volutes $6_1$, $6_2$, $6_3$ adjacent of the supporting blade rings 2–4. The adjacent ends of these partial volutes are connected to one another and form fins 7 penetrating in the ring of supporting blades each in place of one of the blades 4. FIGS. 5 and 6 also show the guide blades 8 of the turbine guide vane, and the turbine runner 9.

Of course, the turbine runner 9 could be replaced by a pump runner and its guide vane by a pump diffuser.

Figure 7:
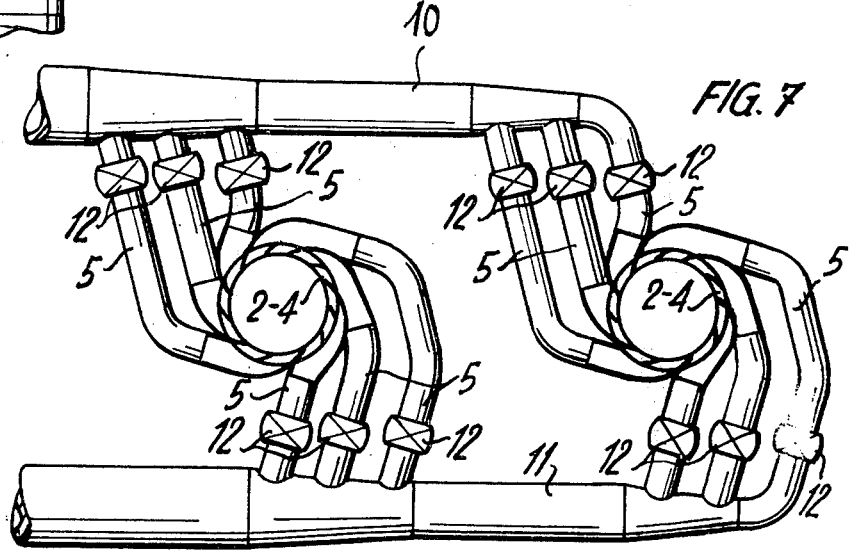
FIG. 7 is a top plan view, partly in transverse cross-section, of a second embodiment, showing the fixed parts of two turbines each connected to two pressure pipelines.

In the embodiment shown in FIG. 7, the supporting blade rings 2–4 of two turbines or pumps are connected to two pressure pipelines 10 and 11 on opposite sides of the turbines or pumps. In this case, the section of the pressure pipelines 10, 11 and of the connection elements 5 can be further reduced by a half. The same applies to the valves or gates 12 fitted on each of the connection elements 5.

In the variation shown in FIG. 8, the supporting blade rings 2–4 of two turbines or pumps are connected to two branch pipes 13, 14 of a single pressure pipeline 10. Each of these turbines or pumps has at the periphery of its supporting blade ring four sprial sections or partial volutes $6_1$, $6_2$, $6_3$, $6_4$ and four respective connection elements $5_1$, $5_2$, $5_3$, $5_4$. The connection elements $5_3$ and $5_4$ of spiral sections $6_3$ and $6_4$ of the supporting blade ring of the upper machine are directly connected respectively to branch pipe 13 and branch pipe 14 of pressure pipeline 10. The same applies to the connection elements $5_2$ and $5_1$ respectively of the lower machine. To the contrary, element $5_2$ of the upper machine and element $5_3$ of the lower machine are connected to branch pipe 13 by a manifold 15, and likewise element $5_1$ of the upper machine and element $5_4$ of the lower machine are connected to branch pipe 14 of pressure pipeline 10 by means of a manifold 15. Each of the connection elements has a valve or gate 12.

In the embodiment shown in FIG. 9, a turbine or pump has at the periphery of its supporting blade rings 2–4 four spiral sections or partial volutes $6_1$, $6_2$, $6_3$, $6_4$ and four connection elements $5_1$, $5_2$, $5_3$ and $5_4$ connected in pairs to pressure pipeline 10 by manifolds 15. A valve or gate 12 is fitted on each of the connection elements $5_1$, $5_2$, $5_3$, $5_4$.

Alternatively, as per the variation shown in FIG. 10, a single valve or gate 12 may be provided on the manifold 15 of each pair of connection element $5_1$, $5_4$ and $5_3$, $5_2$.

Numerous other variations can be envisaged.

Instead of having a vertical axis, the hydraulic machines connected to one or several pressure pipelines by several independent connection elements could, for example, have an inclined or horizontal axis.

Instead of having a constant section, the tubular connection elements 5 could converge or diverge in the direction of the partial volutes.

I claim:

1. A hydraulic power plant comprising a pair of machines of the radial flow type, each machine of said pair of machines including a runner, a blade ring surrounding said runner, a pressure pipeline, means connecting said blade ring to said pressure pipeline, said connecting means comprising a plurality of partial volutes each surrounding a different portion of the periphery of said blade ring, a plurality of pipes each connecting one of said partial volutes with said pressure pipeline and a valve for each pipe thereby providing substantially equal distribution of the hydraulic stresses around said blade ring.

* * * * *